United States Patent
Jarry et al.

(10) Patent No.: US 10,837,081 B2
(45) Date of Patent: Nov. 17, 2020

(54) METHOD FOR USING A TUBULAR SONOTRODE

(71) Applicant: CONSTELLIUM ISSOIRE, Issoire (FR)

(72) Inventors: Philippe Jarry, Grenoble (FR); Jean-Louis Achard, Vizille (FR)

(73) Assignee: CONSTELLIUM ISSOIRE, Issoire (FR)

(*) Notice: Subject to any disclaimer, the term of this patent is extended or adjusted under 35 U.S.C. 154(b) by 649 days.

(21) Appl. No.: 15/524,123

(22) PCT Filed: Nov. 2, 2015

(86) PCT No.: PCT/FR2015/052941
§ 371 (c)(1),
(2) Date: May 3, 2017

(87) PCT Pub. No.: WO2016/071613
PCT Pub. Date: May 12, 2016

(65) Prior Publication Data
US 2017/0335427 A1   Nov. 23, 2017

(30) Foreign Application Priority Data

Nov. 5, 2014  (FR) ..................... 14 02500

(51) Int. Cl.
*C22B 9/02* (2006.01)
*B60B 3/00* (2006.01)
(Continued)

(52) U.S. Cl.
CPC ............... *C22B 9/026* (2013.01); *B06B 3/00* (2013.01); *B22D 1/00* (2013.01); *B22D 1/002* (2013.01);
(Continued)

(58) Field of Classification Search
CPC ....... C22B 9/026; C22B 21/06; C22B 21/064; B22D 1/00; B22D 1/002; B06B 3/00; Y02P 10/234
See application file for complete search history.

(56) References Cited

U.S. PATENT DOCUMENTS

2011/0247456 A1* 10/2011 Rundquist ............... C21C 7/072
75/392
2012/0090432 A1   4/2012 Bryant et al.
(Continued)

FOREIGN PATENT DOCUMENTS

EP   0819772 A1 * 1/1998 .......... C21C 7/0056
EP   0819772 A1   1/1998
(Continued)

OTHER PUBLICATIONS

EP-0819772-A1, Hennings et al. (machine translation) (Year: 1998).*
Borgonovo et al., "Synthesis of die-castable nano-particle reinforced aluminum matrix composite materials by in-situ gas-liquid reactions," Metallurgical Science and Technology, vol. 30-1 Ed. 2012, pp. 15-21). (Year: 2012).*
(Continued)

*Primary Examiner* — John A Hevey
(74) *Attorney, Agent, or Firm* — McBee Moore & Vanik IP, LLC

(57) ABSTRACT

The method includes the following steps:
a) providing a tubular sonotrode (1) formed in a material substantially inert to liquid aluminum, such as a ceramic, for example, silicon oxynitride, the sonotrode comprising a first open end region (2) and a second optionally closed end region (3),
b) submerging at least some of the open end region (2) of the tubular sonotrode (1) in the liquid aluminum alloy, and
c) applying power ultrasound on the liquid aluminum alloy by means of the tubular sonotrode (1).

15 Claims, 4 Drawing Sheets

(51) Int. Cl.
  *C22B 21/06* (2006.01)
  *B06B 3/00* (2006.01)
  *B22D 1/00* (2006.01)

(52) U.S. Cl.
  CPC ............ *C22B 21/06* (2013.01); *C22B 21/064* (2013.01); *Y02P 10/20* (2015.11)

(56) References Cited

U.S. PATENT DOCUMENTS

| | | | | |
|---|---|---|---|---|
| 2012/0225172 | A1* | 9/2012 | Bates | B01D 19/0078 426/238 |
| 2012/0237395 | A1* | 9/2012 | Jarry | B22D 1/00 420/528 |
| 2016/0199907 | A1* | 7/2016 | Jarvis | B22D 1/00 75/10.67 |

FOREIGN PATENT DOCUMENTS

| | | |
|---|---|---|
| JP | 2002053941 A | 2/2002 |
| JP | 2007239102 A | 9/2007 |
| WO | 2013055778 A2 | 4/2013 |

OTHER PUBLICATIONS

Komarov, S. et al., "A Novel Ultrasonic Csting Process Using Controlled Cavitation and Mel Flow in Hot Top Molds", Materials Science Forum, Jun. 20, 2014, pp. 124-129, vol. 794-796.

Komarov, S. et al., "Characterization of acoustic cavitation in water and molten aluminium alloy", Ultrasonic Sonochemistry, 2013, pp. 754-761, vol. 20.

Search Report of French Patent Application No. 14/02500 dated Jul. 9, 2015.

* cited by examiner

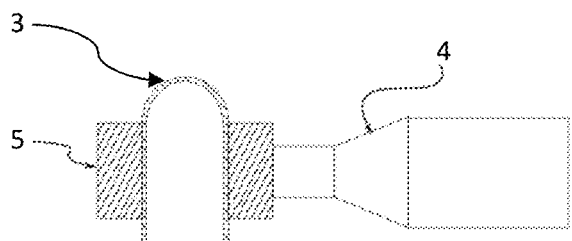
FIG. 1
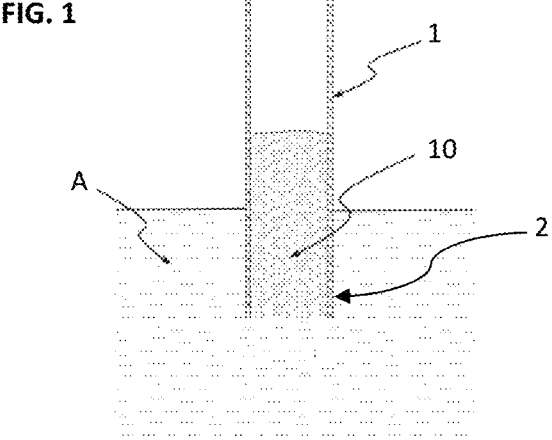
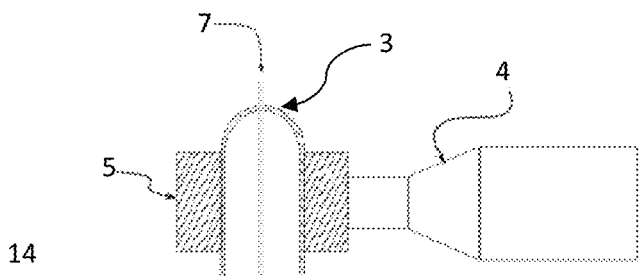
FIG. 2
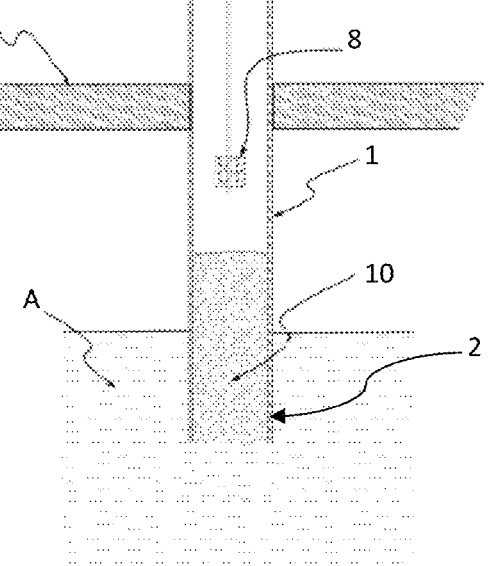

METHOD FOR USING A TUBULAR SONOTRODE

CROSS-REFERENCE TO RELATED APPLICATIONS

This application is a National Stage entry of International Application No. PCT/FR2015/052941, filed Nov. 2, 2015, which claims priority to French Patent Application No. 14/02500, filed Nov. 5, 2014.

BACKGROUND

Field

The invention relates to the field of treatment of liquid aluminum alloys by ultrasound. More specifically, it relates to an improved device and method using at least one refractory ceramic sonotrode enabling optimized transmission of ultrasound for treatment purposes such as degassing (removal of dissolved hydrogen from the liquid metal), the mechanical action on the oxides present in the alloy (wetting, fragmentation, agglomeration, reduction of their apparent diameter by compacting in the acoustic pressure field, etc.), grain refining, titering, changing the composition of the alloy or any other treatment enabling the mechanical properties of the aluminum alloy to be improved once cooled and solidified.

Description of Related Art

It is known that power ultrasound makes it possible to degas light liquid alloys, in particular aluminum alloys [G. I. Eskin, Ultrasonic Treatment of Light Alloy Melts, Gordon and Breach Science Publishers, 1998]. The hydrogen dissolved in the aluminum alloy diffuses toward the cavitation bubbles generated by the ultrasound pressure field; the oscillation of the bubbles thus formed under the effect of the acoustic pressure field produces a so-called rectified amplified diffusion effect; the use of a purge gas and/or a partial vacuum above the metal bath to improve the efficacy of the degassing has been studied and patented; in addition, ultrasound helps to finely disperse purge gas bubbles (US 2007/0235159 A1; WO2011/127402 A1).

However, the regions affected by the acoustic pressure field are located near the sonotrode. The cavitation bubbles themselves absorb a portion of the power injected, and the same is true of inclusions (in particular, oxides) present in the liquid aluminum alloy, which moreover form cavitation nuclei. The more the liquid aluminum alloy contains dissolved gas and oxide inclusions where hydrogen is adsorbed, the more the ultrasound is absorbed by the cavitation even as these impurities grow. Therefore, in practice, the volume usefully assigned by an insonification system does not exceed several liters, or some ten cm around the sonotrode. The only industrial applications are thus in the field of foundry, in which restricted volumes can be degassed; or, for continuous casting, in the field of low metal flow rates (order of amplitude 1-10 tonnes/hour) such as, for example, with a casting wheel [Southwire Ultra-D™ process]. For semi-continuous casting with a high metal flow rate (50-100 tonnes/hour) with degassing pockets on the order of the cubic meter, and for very exacting alloys in terms of degassing and inclusion cleanliness, the problem of scaling up is not solved by the prior art.

The shortcomings in these methods are due in particular to the lack of stability of the waveguide liquid aluminum alloy interface. It is known, in fact, that the waveguides must be wetted by the liquid aluminum alloy in order to enable energy to be transmitted to the liquid aluminum alloy. For this reason, the waveguides used are made of metal, in particular steel or titanium.

However, this is not enough to obtain perfect wetting, and methods have been developed in order to improve this. Examples are in particular the patent EP0035545B1, under priority of 1979, of "Reynolds Metal Company", which claims the vapor-phase deposition of an aluminum film on a titanium sonotrode. But in fact, even in such a configuration, the quality of the wetting changes evolves with use due to the reaction of the material of the waveguide with the liquid aluminum alloy.

Refractory materials are not used in aluminum alloys specifically because they are not wetted by the liquid aluminum alloy. Only one chemical deposition method would enable the wetting to be achieved, but for a limited time, which is not reliable, practical or economical.

Therefore, there is no method or apparatus capable of reliably treating a liquid aluminum alloy in a large fraction of the cast aluminum alloy.

However, there is a real need for the treatment and purification of aluminum alloys for which performance in terms of elimination of porosity, or increase in modulus, or improved refining of the grain or reinforcement with particles is useful, in particular in the field of casting alloys for aeronautics, composite alloys for nuclear applications, free-cutting alloys having improved machining properties, or molding or continuous casting alloys having improved castability.

SUMMARY

One of the objectives of this invention is thus to overcome the problem of insonification of large liquid aluminum alloy volumes and enabling scaling up. To this end, this invention proposes a method for using a sonotrode wetted by the liquid aluminum alloy, including the following steps:

a) providing a tubular sonotrode formed in a material substantially inert to liquid aluminum, i.e. not significantly dissolving in the latter, such as a ceramic, for example, silicon oxynitride, the sonotrode comprising a first open end region (2) and a second preferably closed end region (3), b) submerging at least some of the open end region (2) of the tubular sonotrode in the liquid aluminum alloy, and c) applying power ultrasound on the liquid aluminum alloy by means of the tubular sonotrode.

DETAILED DESCRIPTION OF A PREFERRED EMBODIMENT

According to an alternative, the sonotrode in step a) has previously been wetted by partial immersion in a liquid aluminum alloy (M) having a content of at least 0.05% magnesium and application of power ultrasound.

By this method, the sonotrode wetted by the liquid aluminum alloy enables an optimized transmission of power ultrasound. The sustained wetting, in particular over several days without a sonotrode cleaning or polishing operation, enables the effective treatment of the liquid aluminum alloy. In addition, the tubular shape of the sonotrode enables the phenomenon of cavitation in the liquid aluminum alloy to be optimized, ensuring the treatment on a large volume and in particular on an industrial scale.

In fact, the liquid aluminum alloy contained inside the tubular sonotrode is the site of an extremely intense cavitation due to the fact that it is produced by waves converging at the center of the tubular sonotrode and that there is therefore no loss of power, as occurs outside a sonotrode in the form of a solid rod. The cavitation bubbles thus generated in the liquid aluminum alloy pump the gas contained in the tubular sonotrode very effectively.

The tubular sonotrode provided in step a) of the method comprises a first open end region and a second preferably closed end region, and step b) includes the submersion of the first open end region in the liquid aluminum alloy.

In fact, the inventors have observed that, when a tubular sonotrode open at a first end region is submerged into a crucible of the liquid aluminum alloy and closed to a second end region, and it is excited by power ultrasound transmitted by means of a power ultrasound emission transducer, attached to a metal flange clamped or adhered or screwed around the upper portion of the tubular sonotrode, a reduction in the level of aluminum alloy in the crucible occurs due to a pumping effect in the tubular sonotrode. This pumping produces a partial vacuum in the tubular sonotrode, resulting in an increase in the level of liquid aluminum alloy in the tubular sonotrode and a concomitant reduction in the level of liquid aluminum alloy in the crucible around the tubular sonotrode. Thus, the use of this tubular sonotrode creates a turbulent pumping mechanism that makes it possible to very quickly degas the liquid aluminum alloy owing to the creation of a strong hydrogen concentration gradient between the metal distant from the sonotrode and the metal contained in the tubular sonotrode and subjected to intense cavitation.

Similarly, this method also makes it possible to fragment, wet and crumple the oxide films present in the liquid aluminum alloy. The oxides then have reduced sizes upon casting, thereby inhibiting the formation of solidification porosity.

According to the same principle, this turbulent pumping also contributes to a grain refining effect, by fragmentation and/or partial remelting of the dendrite arms induced by the acoustic currents or "acoustic streaming", caused by the injection of acoustic energy into the liquid alloy. During solidification of the alloy, an increased quantity of grain seals is thus obtained. The castability of the alloy is improved and the mechanical properties of the primary solidification aluminum obtained are largely improved, in particular the ductility of the material and its elongation capacity, owing to the elimination of oxides and porosity due to the refining of the grain.

Advantageously, step c) of the method includes a step i) of placement of the liquid aluminum alloy surface under an inert anhydrous atmosphere outside and inside the tubular sonotrode. This arrangement makes it possible to reduce contact between the humidity of the atmosphere and the liquid aluminum alloy so as to improve the efficacy of the degassing.

According to one possibility, the placement of the liquid aluminum alloy surface under an inert anhydrous atmosphere inside the tubular sonotrode according to step i) includes the injection of an anhydrous inert gas inside the tubular sonotrode. The gas used can in particular be dry argon or dry nitrogen or any other anhydrous gas, non-reactive to the liquid aluminum alloy under the conditions of application.

Preferably, the anhydrous inert gas is injected and circulates by means of the second end region of the tubular sonotrode so as to evacuate the hydrogen extracted from the metal by cavitation bubbles. An injection tube and an evacuation tube are, for example, tightly sealed to orifices provided at the top of the second region.

According to another aspect, the surface of the liquid aluminum alloy outside the tubular sonotrode is kept under a dry and inert gas cover so as to prevent re-gassing by the free surface of the alloy.

According to a complementary arrangement, a hydrogen trap, configured so as to react with the hydrogen and retain it is arranged inside the tubular sonotrode. The trap is advantageously placed inside the tubular sonotrode by means of a tube for injection of an anhydrous gas inert to the liquid aluminum alloy tightly sealed to the top of the second end region of the tubular sonotrode. The degassing of the liquid aluminum alloy contained inside the sonotrode thus occurs very quickly.

Advantageously, the method also includes a step of creating a descending velocity field in the liquid aluminum alloy at the first end region of the tubular sonotrode, so as to generate a descending liquid aluminum alloy flow inside the tubular sonotrode. By creating this descending velocity field at the mouth of the tubular sonotrode, the renewal of the alloy inside the tubular sonotrode is activated, by aspirating the aluminum alloy toward the bottom. This velocity field may be created by the acoustic current phenomenon, known as "acoustic streaming". The exchanges are then increased between the degassed aluminum alloy inside the tubular sonotrode and the aluminum alloy outside it. The degassing kinetics initially associated with the hydrogen diffusion kinetics between the distant metal and the metal subjected to cavitation in the tubular sonotrode is improved by the convention thus generated. The result is that a large volume of liquid aluminum alloy may be treated by this method.

According to one possibility, the liquid aluminum alloy is placed in an induction crucible configured so as to generate a descending velocity field in the liquid aluminum alloy at the first end region of the tubular sonotrode. The convention that is created by the electromagnetic forces induced in the liquid metal thus makes it possible to accelerate the renewal of the liquid aluminum alloy in the tubular sonotrode.

According to another possibility, step a) of the method consists in providing a tubular sonotrode, the first end region of which has a flared shape configured so as to generate a descending velocity field at the first end region of the tubular sonotrode. The sonotrode thus takes the shape of a "trumpet" or "tulip" opening outwardly from the sonotrode at the first end region. This flared shape creates, by "acoustic streaming", a descending vertical velocity. The flow generated is opposed by the aspiration effect toward the top of the sonotrode so that the mixture between the liquid aluminum alloy outside the sonotrode and that degassed inside the latter is accelerated, thus promoting the renewal of the alloy inside the sonotrode.

According to another possible embodiment, the application of power ultrasound of step c) is performed intermittently, and the method includes, between two power ultrasound applications, the use of an over-pressure applied on the surface of the liquid aluminum alloy inside the tubular sonotrode, so as to form an intermittent descending velocity field in the liquid aluminum alloy. This over-pressure is, for example, obtained by dry argon injection at regular intervals so as to flush the degassed liquid aluminum alloy from the tubular sonotrode and re-aspirate the mixed alloy during the subsequent reduction in pressure. This method acts as a divider in each recirculation cycle.

According to an alternative, the method includes a step ii) of placing the liquid aluminum alloy under a partial vacuum inside the tubular sonotrode during the intermittent application of power ultrasound in step c). This partial vacuum, on the order of one hundred pascal, enables the partial pressure of hydrogen to be dropped above the cavitation area and activates the degassing.

According to yet another alternative, the method includes the arrangement of a complementary sonotrode, generally in the form of a rod with a flat end, in the liquid aluminum alloy at the first end region of the tubular sonotrode, the application of power ultrasound of step c) being performed continuously, and the method including a step iii) consisting in exciting the complementary sonotrode in longitudinal mode, so as to create an intermittent acoustic current in the liquid aluminum alloy. The positioning of the complementary sonotrode enables the acoustic streaming velocity field to be increased. This alternative also enables the liquid aluminum alloy to be driven toward the bottom of the sonotrode by a suction effect, thereby enabling the alloy contained inside the tubular sonotrode to be renewed.

According to one possibility, the complementary sonotrode is intermittently excited. The hypothesis formulated by the inventors to explain the improvement obtained is that, in this case, the flushing effect is improved.

According to an alternative, the complementary sonotrode is continuously excited. The hypothesis is that this embodiment enables the continuity of the renewal of aluminum in the tubular sonotrode to be improved.

Advantageously, the method includes a step y) comprising the incorporation of ceramic particles in the liquid aluminum alloy A contained in the tubular sonotrode. This arrangement makes it possible to develop a metal matrix composite in order to obtain a reinforced aluminum alloy, which, once cooled, has improved mechanical strength properties.

According to one possibility, the method includes a step comprising the at least partial submersion of a master alloy wire in the liquid aluminum alloy A contained in the tubular sonotrode. This configuration then enables the rapid titering of the liquid aluminum alloy, combined with the degassing and the fragmentation of oxides of the alloy, owing to the accelerated dissolution of the wire in the cavitation field.

Advantageously, the method includes a step comprising the application of gaseous NH3 in the liquid aluminum alloy A contained in the tubular sonotrode so as to form a composite Al—AlN material. It is thus possible to provide elements initially absent in the liquid aluminum alloy, for example, by replacing the dry inert gas supply with a gas and reagent under the conditions used. The cavitation therefore plays the role of catalyzer of the reaction between the liquid aluminum alloy and the reactive gas.

According to a second aspect, the invention relates to an insonification device suitable for the treatment of the liquid aluminum alloy A, the insonification device including a tubular sonotrode formed in a material substantially inert to liquid aluminum, such as a ceramic, for example a silicon oxynitride, and a power ultrasound emission transducer attached to the tubular sonotrode. This device enables different embodiments of the method to be implemented, as described above, enabling the degassing, the fragmentation of oxides and the supply of other ceramic, metal or gaseous elements, to the liquid aluminum alloy.

Advantageously, the tubular sonotrode of the insonification device comprises a first open end region and a second closed end region, the first open end region being intended to be wetted in the liquid aluminum alloy.

Other aspects, objectives and advantages of this invention will become clearer in view of the following description of a plurality of embodiments, provided as a non-limiting example and in reference to the appended drawings. The figures do not necessarily respect the scale of all of the elements respected, for the sake of readability. In the description below, for the sake of simplification, identical, similar or equivalent elements of the various embodiments have the same numeric references.

FIG. 1 shows a tubular sonotrode used in the method according to an embodiment of the invention.

FIG. 2 shows a step i) of the use of an anhydrous atmosphere according to an embodiment of the invention.

Figure 3:
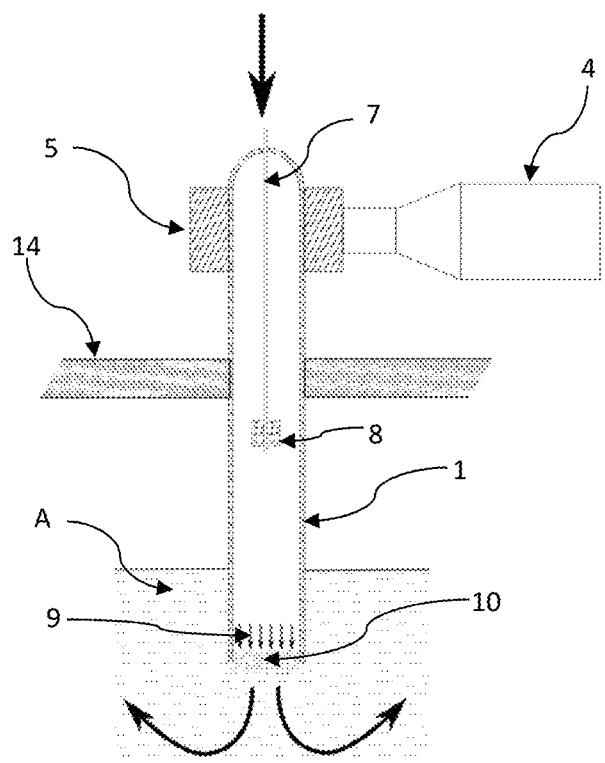

FIG. 3 schematically shows the creation of a descending velocity field according to an embodiment of the invention.

Figure 4:
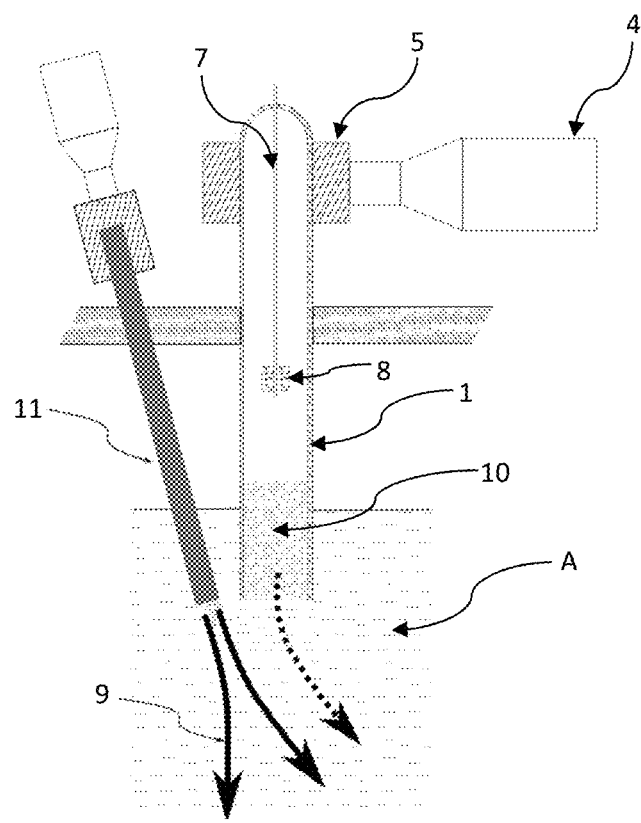

FIG. 4 schematically shows the creation of a descending velocity field according to a second embodiment of the invention.

Figure 5:
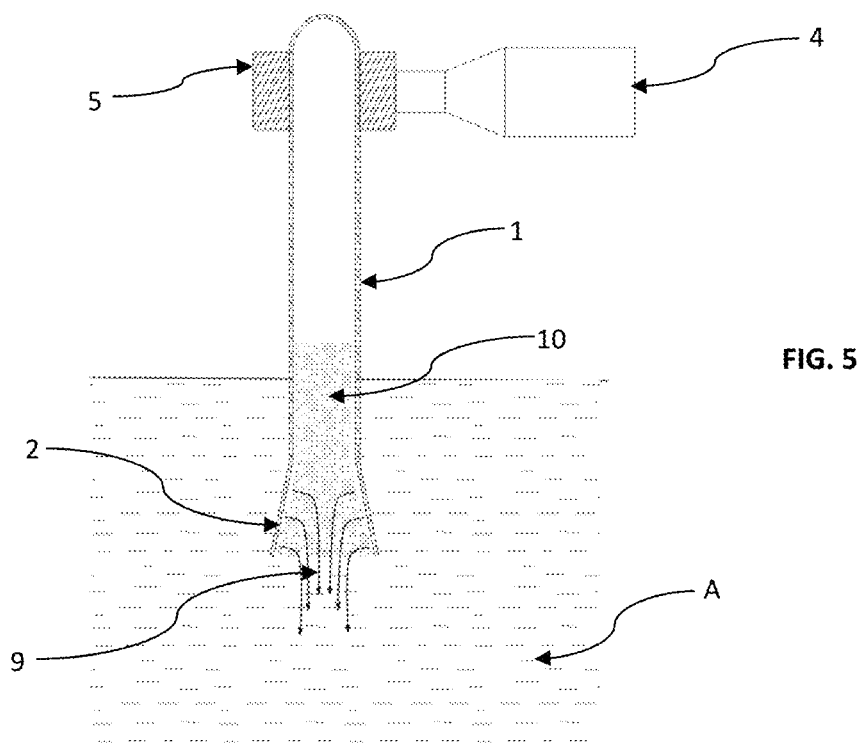

FIG. 5 schematically shows a flared tubular sonotrode according to an embodiment of the invention.

Figure 6:
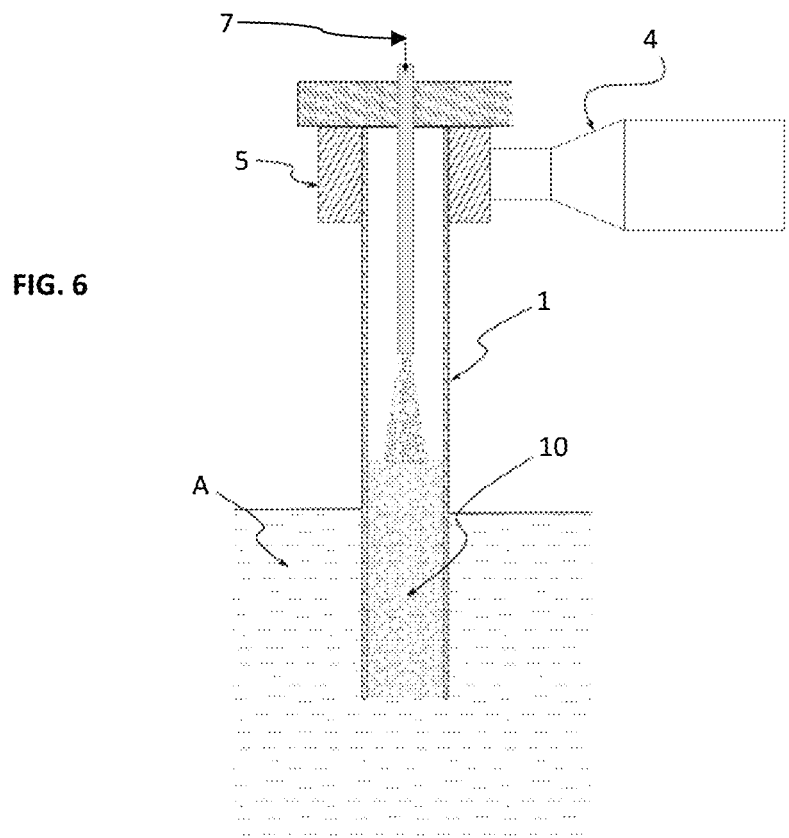

FIG. 6 schematically shows a step of incorporation of ceramic particles according to an embodiment of the invention.

Figure 7:
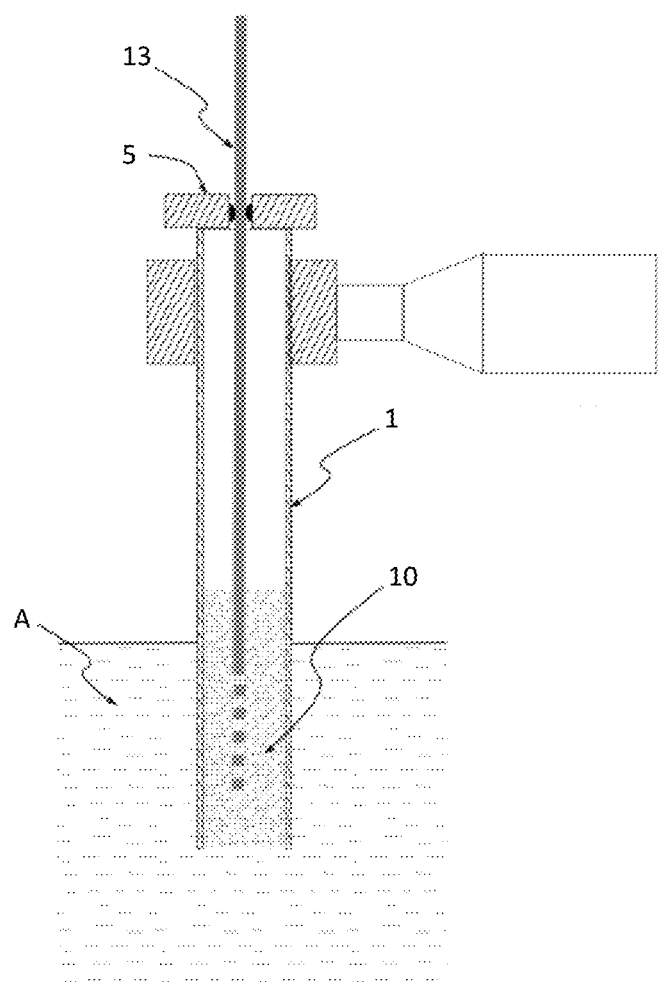

FIG. 7 schematically shows a step of incorporation of a master alloy wire according to an embodiment of the invention.

As shown in FIG. 1, the method consists in submerging a tubular sonotrode 1 in a bath of a liquid aluminum alloy and applying power ultrasound so as to obtain an intense cavitation 10 at the center of the sonotrode 1.

The tubular sonotrode 1 used is made of SIALON, and measures 60 mm in diameter. It includes a first open end region 2 submerged in the aluminum alloy and a second closed end region 3 to which a power ultrasound emission transducer 4 is attached by means of a flange 5.

According to an alternative not shown, the sonotrode 1 was first prepared by forming a wetting with a liquid aluminum alloy M. To do this, the tubular sonotrode 1 was partially submerged in a liquid aluminum alloy bath M having a content of at least 0.05% magnesium by weight. It was then subjected to power ultrasound having a frequency of around 22 kHz with a power of 10 W until the wetting by the liquid aluminum alloy M is obtained. Once wetted, the sonotrode 1 was submerged in the liquid aluminum alloy not containing magnesium, and a new power ultrasound application enabled the wetting to be regenerated. This can thus be preserved for more than 5 days without requiring a complementary cleaning or polishing intervention. The intermittent or continuous application of power ultrasound is alone sufficient for maintaining the wetting of the tubular sonotrode 1 in the aluminum alloy.

In the embodiment shown in FIG. 1, ultrasound is applied with a frequency of around 22 kHz, and the level of liquid aluminum alloy decreases very quickly in the crucible, which is a sign of extremely intense cavitation 10 inside the tubular sonotrode 1, leading to degassing of the alloy. The initial hydrogen content of the bath was 0.27 ml/100 g; after 10 minutes of treatment the content decreased to 0.17 ml/100 g; after 10 additional minutes of treatment, the content reached a value close to the equilibrium content, which, inconsideration of the ambient humidity, was 0.14 ml/100 g. The initial degassing rate obtained with this insonification device 6 is therefore 0.01 ml/100 g/min, while the spontaneous degassing rate is around 10 times lower. The maximum rate obtained at the start of the degassing with a sonotrode-titanium flat-bottom rod is 0.0035 ml/100 g/min, i.e. three times lower.

A hypothesis capable of explaining the intensity of the cavitation 10 obtained inside the sonotrode 1 is that the cavitation 10 is produced by waves converging at the center of the tubular sonotrode 1 and that there is therefore no power loss as occurs outside the sonotrode 1. The cavitation bubbles 10 thus generated in the liquid aluminum alloy pump the gas contained in the tubular sonotrode 1. When the tubular sonotrode 1 is closed in the second end region 3, this pumping produces a partial vacuum in the sonotrode 1, resulting in an increase in the level of aluminum alloy therein, and the observation of a concomitant reduction in the level of aluminum alloy A in the crucible around the sonotrode 1. This turbulent rise in the sonotrode 1, accompanied by an extremely intense cavitation 10, significantly increases the exchange surface between the liquid aluminum alloy and the gas contained in the sonotrode 1. This generates a turbulent pumping mechanism that enables the liquid alloy contained in the sonotrode 1 to be degassed very quickly.

Thus, the insonification device 6 shown in figure operates as an ultrasound aspiration pump for the liquid aluminum alloy.

According to alternative embodiments not shown, the material of the sonotrode 1 is chosen from ceramics, such as nitrides or oxynitrides, which are inert to the liquid aluminum alloy under the conditions of implementation of the method. The frequency of the power ultrasound capable of being used is within a range of 10 to 100 kHz and the power is greater than 10 W.

According to a possibility shown in FIG. 2, the surface of the liquid aluminum alloy is placed under an anhydrous inert atmosphere, inside the volume of the tubular sonotrode 1 and also outside the sonotrode 1, so as to avoid regassing by the surface of the liquid aluminum alloy A. A tube 7 tightly sealed at the second end region 3, to the top of the tubular sonotrode 1, enables anhydrous argon to be injected inside the sonotrode 1. The liquid aluminum alloy surface outside the tubular sonotrode 1 is also kept under an anhydrous argon (inert gas) cover maintained by closure means 14.

To further improve the insonification device 6, the inventors have introduced, suspended from a thermocouple, a tube 7 for injection of anhydrous argon and a hydrogen trap. The thermocouple is used to properly set the trap at a temperature that enables its activation (between 300 and 400° C.) along the vertical descending gradient in the sonotrode 1. The degassing of the aluminum alloy contained inside the sonotrode 1 then occurs extremely quickly due to the intensity of the turbulence and the cavitation 10 concomitant with the pumping effect by the liquid alloy of the internal atmosphere of the tubular sonotrode 1, and because this atmosphere is maintained at a very low level of partial hydrogen pressure by the hydrogen trap 8.

According to an alternative, the method includes a step comprising the introduction of a reactive gas such as gaseous NH3, in place of the neutral argon gas as shown in FIG. 3, in the liquid aluminum alloy contained in the tubular sonotrode 1 so as to form a composite Al—AlN material. In fact, the power ultrasound makes it possible to achieve very high and very local temperature peaks at the time of implosion of the cavitation bubbles 10. This enables the following reaction to be catalyzed: $Al+NH_3 \rightarrow AlN+1.5H_2$, which typically occurs only at very high temperature. Moreover, the hydrogen trap 8 located inside the tubular sonotrode 1 captures the hydrogen released and prevents the metal alloy from being regassed when the reaction occurs. It is thus possible to simply develop Al—AlN composites with particle sizes of 10 to 100 nm.

As shown in FIG. 3, a descending velocity field 9 is created in the liquid aluminum alloy A near the opening of the first end region 2 of the sonotrode 1 so as to promote exchanges between the alloy inside and the alloy outside the sonotrode 1 and improve the degassing kinetics in order to treat a large alloy volume in a time compatible with industrial constraints. The solution shown in FIG. 3 consists in applying, at regular intervals, dry argon over-pressures in the tube 7 so as to flush the degassed liquid alloy into the volume of the crucible containing the liquid aluminum alloy and re-suction the mixed aluminum alloy during the subsequent reduction in pressure.

FIG. 4 describes the solution that consists in introducing a complementary sonotrode 11 in the form of a solid rod, excited in longitudinal mode next to the opening of the tubular sonotrode 1, in order to locally create a powerful intermittent acoustic current, between two regular power ultrasound applications, driving the internal alloy toward the bottom of the sonotrode 1 by a suction effect. This thus enables the alloy contained inside the tubular sonotrode 1 to be renewed.

FIG. 5 describes the solution that consists in using a tubular sonotrode 1 flared at the first end region 2, so as to create, by "acoustic streaming", a vertical descending velocity.

Other embodiments, which are not shown, exist for creating this descending velocity field 9. One alternative consists in particular in using an induction crucible designed so that, around the tubular sonotrode 1, there is a vertical descending velocity field that drives the interior aluminum alloy and enables the renewal thereof to be accelerated. According to another alternative, the application of power ultrasound is performed by intermittence between which an over-pressure of anhydrous argon is used inside the sonotrode 1 by means of the tube 7 tightly sealed to the second end region 3. According to yet another possibility, the vacuum is produced inside the sonotrode 1 between each dry argon over-pressure, during application of the power ultrasound.

FIG. 6 shows a liquid aluminum alloy treatment consisting in incorporating SiC particles according to step y) of the method, so as to produce a metal matrix composite. Other refractory ceramic materials may be used, such as alumina, according to the final mechanical properties desired for the composite. The introduction of the particles is performed conjointly with the injection of anhydrous argon through the sealed tube 7 and is performed in two phases: a first phase consists in introducing the particles while the liquid aluminum alloy rises in the tubular sonotrode 1 by being incorporated with the gas present in the tube 7 and the particles conveyed by it. This phase consists in preparing a sort of master liquid composite alloy inside the tubular sonotrode 1. The second phase consists in recycling this dense mixture and diluting it in the rest of the aluminum alloy by one of the means described above. Then, it is begun again with first phase described. The inventors have observed that, in order to prevent the gas, incorporated at the same time as the particles, from causing the particles to float and from rejecting them at the surface, the intermittent use of a complementary rod sonotrode 11 as described in FIG. 4 enables the particles to be distributed in the liquid alloy and the gas bubbles to be fragmented by an inertial cavitation effect 10.

A titering of the liquid aluminum alloy A will now be described in relation to FIG. 7. A master alloy wire 13 is introduced into the tubular sonotrode 1 and hermetically sealed to the second end region 3 so as to at least partially submerge in the aluminum alloy inside the sonotrode 1. The titering of the liquid aluminum alloy is then concomitant with the degassing and fragmentation of the oxide films during application of power ultrasound. Alternatively, the wire 13 may be a refining AlTiB or AlTiC wire or a wire filled with anti-recrystallizing elements intended to oversaturate the alloy, such as Cr, Zr, Hf, V, Sc, etc. It is then possible to obtain an extremely fine distribution of primary intermetallic wires, while the same quantities introduced in the oven in vertical casting lead to prohibitive primary intermetallic coarse grains. In vertical semi-continuous casting, the introduction is performed either at the level of the distributor just before casting or at the level of the cast itself. Similarly, in casting so-called hyper silica alloys, the introduction by means of the tubular sonotrode 1 of an AlCuP wire enables the AlP nuclei to be dispersed and primary silicon crystals to be obtained that are much finer than those obtained when the AlCuP wire is introduced in a standard manner.

Thus, this invention enables power ultrasound to be applied simply to a liquid aluminum alloy over a long period and enables highly varied treatments of degassing, refining and changing of the composition of the aluminum alloy (changing proportions and new elements) to be carried out, over clearly larger volumes than has been traditionally possible, and with cycle times compatible with industrial constraints.

It goes without saying that the invention is not limited to the embodiments described above as an example, but that it includes all technical equivalents and alternatives of the means described as well as the combinations thereof.

The invention claimed is:

1. A method for using a sonotrode, in a first liquid aluminum alloy, comprising:
   a) providing a tubular sonotrode formed from a material substantially inert to liquid aluminum and a power ultrasound emission transducer attached to the sonotrode,
   wherein the sonotrode comprises a first open end region and a second closed end region, and the transducer is attached to the sonotrode at an upper portion closed end region of the tubular sonotrode by means of a flange,
   b) submerging at least some of the open end region of the tubular sonotrode in the liquid aluminum alloy, and
   c) applying power ultrasound transmitted by the transducer to the liquid aluminum alloy by means of the tubular sonotrode, wherein the tubular sonotrode guides ultrasonic waves transmitted by the transducer attached at the upper portion closed end region of the tubular sonotrode to the first liquid aluminum alloy in which the open end region of the tubular sonotrode is submerged,
   wherein the method further creates a descending velocity field in the first liquid aluminum alloy at the first end region of the tubular sonotrode so as to generate a descending flow of the first liquid aluminum alloy inside the tubular sonotrode.

2. The method according to claim 1, wherein the sonotrode in a) has previously been wetted by partially immersing the sonotrode in a second liquid aluminum alloy having a content of at least 0.5% magnesium uby weight and applying the power ultrasound by means of the partially immersed sonotrode.

3. The method according to claim 1, wherein c) comprises i) placing a surface of the first liquid aluminum alloy under an inert anhydrous atmosphere outside and inside the tubular sonotrode.

4. The method according to claim 3, wherein placement of the surface of the first liquid aluminum alloy under an inert anhydrous atmosphere inside the tubular sonotrode according to i) comprises injecting an anhydrous inert gas inside the tubular sonotrode.

5. The method according to claim 1, wherein the first liquid aluminum alloy is placed in an induction crucible configured so as to generate a descending velocity field in the first liquid aluminum alloy at the first end region of the tubular sonotrode.

6. The method according to claim 1, wherein a) comprises providing a tubular sonotrode, the first end region of which has a flared shape configured so as to generate a descending velocity field at the first end region of the tubular sonotrode.

7. The method according to claim 1, wherein the application of power ultrasound of c) is performed intermittently, and the method includes, between two power ultrasound applications, the use of an over-pressure applied on the surface of the first liquid aluminum alloy inside the tubular sonotrode, so as to form an intermittent descending velocity field in the first liquid aluminum alloy.

8. The method according to claim 1, wherein the method comprises arranging a complementary sonotrode, generally in the form of a rod with a flat end, in the first liquid aluminum alloy at the first end region of the tubular sonotrode, wherein application of the power ultrasound of c) is performed continuously, and wherein the complementary sonotrode is excited in longitudinal mode by the power ultrasound applied in c), so as to create an intermittent acoustic current in the first liquid aluminum alloy.

9. The method according to claim 1, wherein the method comprises y) incorporating ceramic particles into the first liquid aluminum alloy present in the sonotrode after b).

10. The method according to claim 1, wherein the method includes at least partial submersion of a master alloy wire in the first liquid aluminum alloy present in the tubular sonotrode after b).

11. The method according to claim 1, wherein the method includes application of gaseous NH3 in the first liquid aluminum alloy present in the tubular sonotrode after b) so as to form a composite Al-AlN material.

12. The method according to claim 1, wherein the material substantially inert to liquid aluminum is ceramic.

13. The method according to claim 1, wherein the material substantially inert to liquid aluminum is silicon oxynitride.

14. The method according to claim 1, wherein the power ultrasound is applied at a frequency of 10 to 100 kHz and a power greater than 10 W.

15. The method according to claim 1, wherein application of the power ultrasound to the liquid aluminum alloy by means of the tubular sonotrode creates an intense cavitation inside the open end region of the tubular sonotrode, wherein the intense cavitation causes an increase in level of the first aluminum alloy inside the open end region of the tubular sonotrode, and a concomitant reduction in level of the first aluminum alloy in a crucible around the sonotrode.

* * * * *